April 9, 1940.  S. N. GOLDMAN  2,196,914
FOLDING BASKET CARRIAGE FOR SELF-SERVICE STORES
Filed March 14, 1938  3 Sheets-Sheet 1
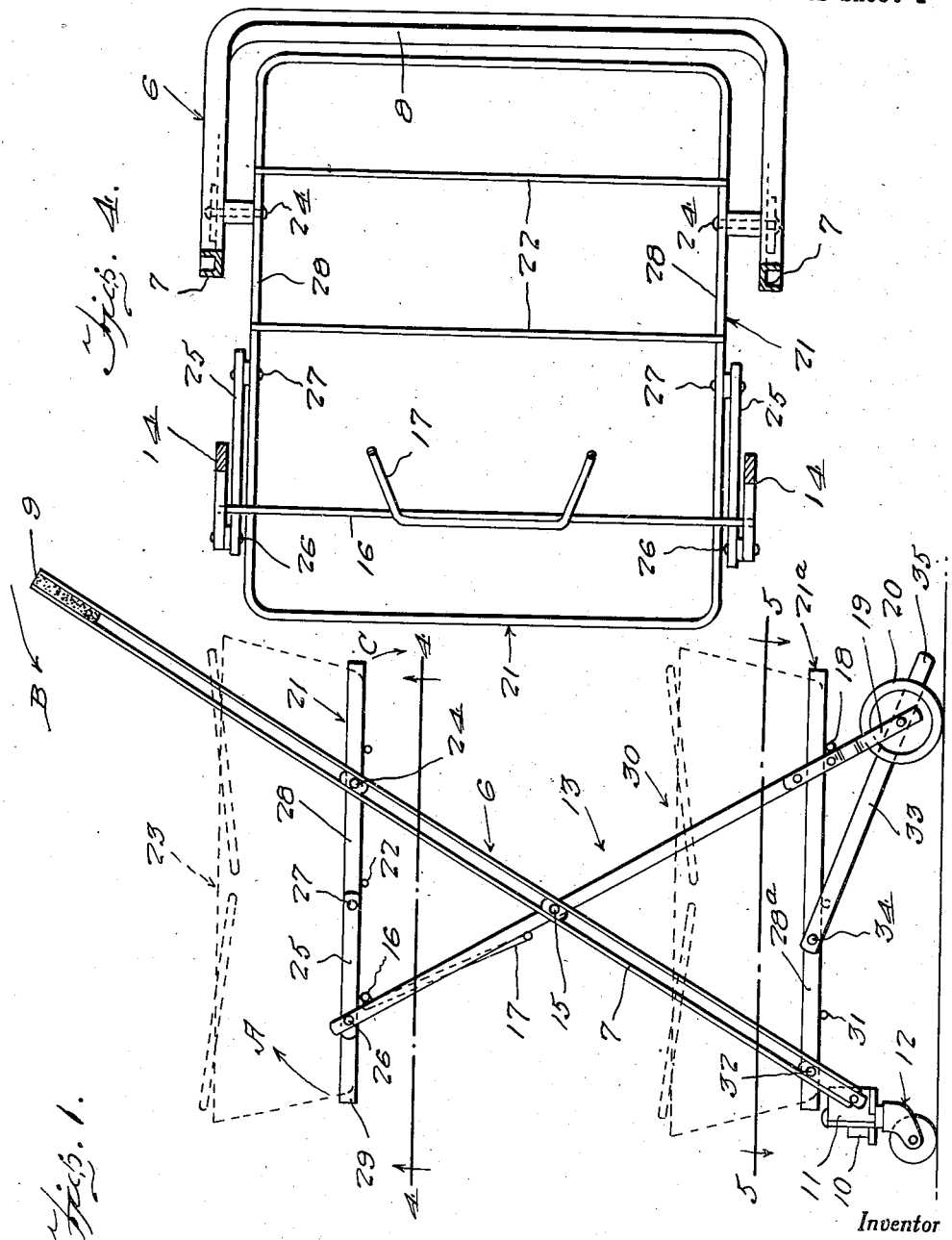
Inventor
S. N. Goldman
By Clarence A. O'Brien
and Hyman Berman
Attorneys April 9, 1940.  S. N. GOLDMAN  2,196,914
FOLDING BASKET CARRIAGE FOR SELF-SERVICE STORES
Filed March 14, 1938  3 Sheets-Sheet 2
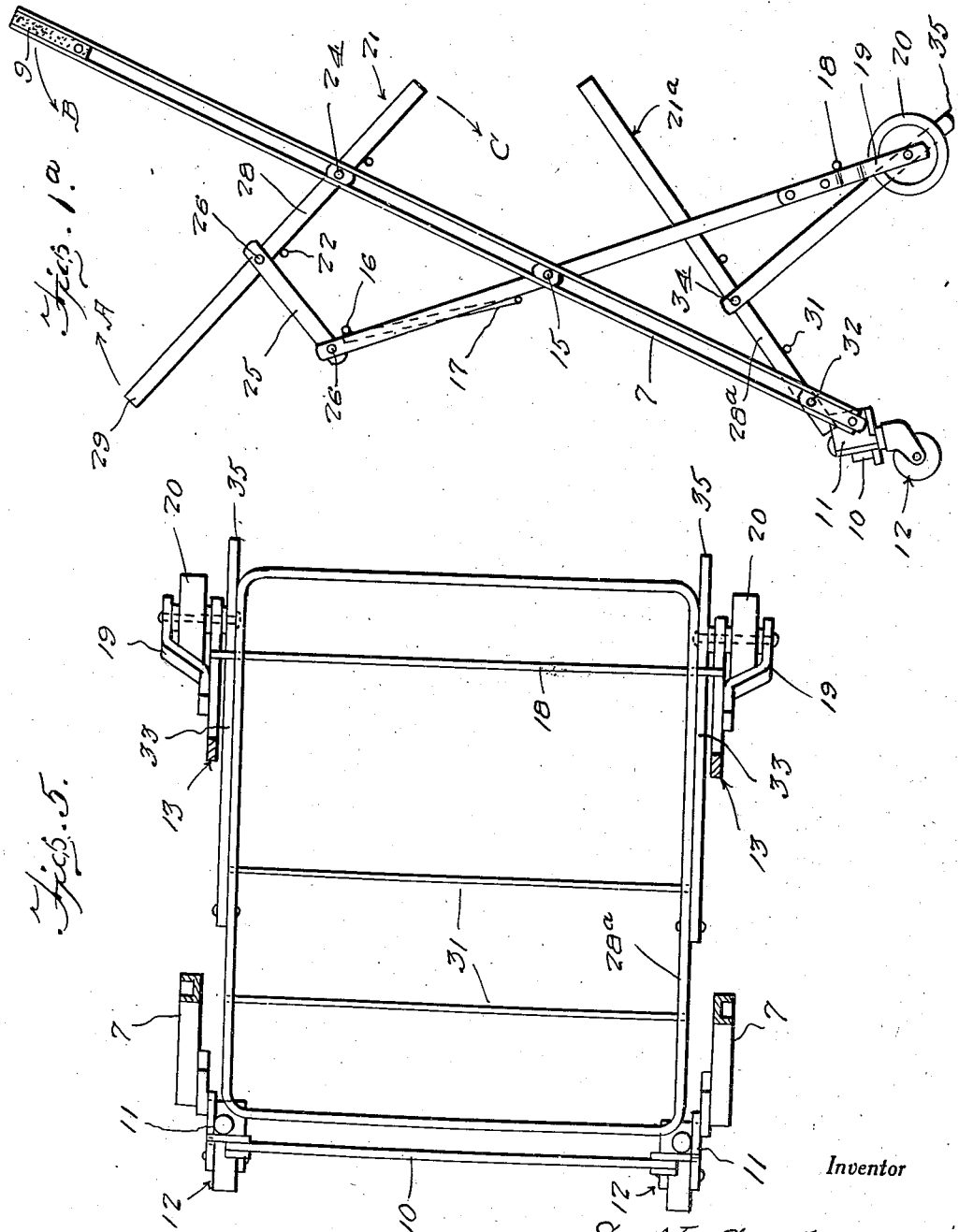
Inventor
S. N. Goldman
By Clarence A. O'Brien
and Hyman Berman
Attorneys

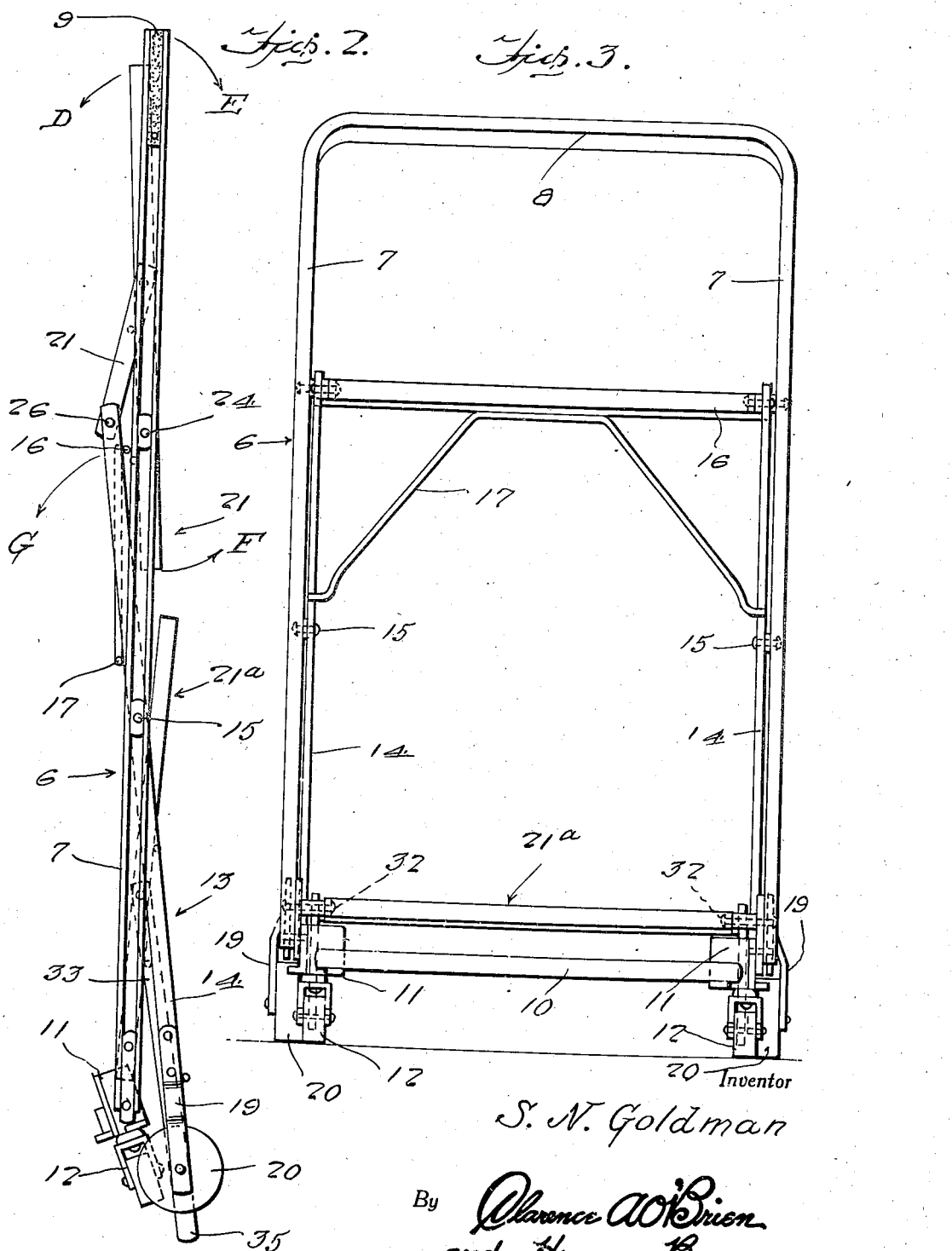

Patented Apr. 9, 1940

2,196,914

UNITED STATES PATENT OFFICE 2,196,914

FOLDING BASKET CARRIAGE FOR SELF-SERVICE STORES

Sylvan N. Goldman, Oklahoma City, Okla.

Application March 14, 1938, Serial No. 195,896

9 Claims. (Cl. 280—36)

The present invention relates to a novel rollable market basket carriage of a lightweight portable type expressly but not necessarily, adapted for convenient usage by shopping customers in grocery stores and similar establishments of the so-called self-service classification.

The chief object of the invention is to provide the trade with a novel lightweight easy to handle multiple rack equipped roller supported carriage, the preferred embodiment being characterized by a dependable structural assemblage which is rigid and reliable when erected for use, and compact and convenient when folded for storage in an out-of-the-way location in the establishment.

In its preferred embodiment the improved construction has to do with the adoption and use of a pair of complemental intersecting pivotally adjoined wheel supported leg frames, there being associated with the upper portions of said frame, an additional frame functioning as a rack and this having linkage connection with the associated parts to provide for the aforesaid rigidity when the device is in use, and to facilitate folding and unfolding with requisite certainty and expediency.

Other features and advantages will become more readily apparent from the following description and accompanying illustrative drawings.

In the drawings, wherein like reference numerals indicate like parts throughout the various complemental views:

Figure 1 is a side elevational view of the pushcart style market basket transporting carriage as structurally perfected in accordance with the conception and principles of this invention, the device being shown erected or set up for the customer's use.

Figure 1—a is a complementary side view showing the same structural arrangement in the process of being collapsed or opening up as the case may be.

Figure 2 is an edge or side elevational view with the parts completely collapsed to what might be called the final state, in which position the device as a unit is susceptible of easy handling and storage.

Figure 3 is a front end elevational view of the structure seen in Figure 1, observing it in a direction from left to right.

Figure 4 is a horizontal section taken on the plane of the line 4—4 of Figure 1 and looking upwardly in the direction of the arrow.

Figure 5 is a similar horizontal section looking downwardly in the direction of the arrow.

Referring now to the drawings by distinguishing reference numerals, and observing in particular Figures 1, 1—a and 2, it will be observed that one leg frame or unit, which may be conveniently identified as the master unit, is denoted by the numeral 6. This is of general U-shaped form and therefore includes parallel longitudinal limbs 7 and a transverse interconnecting bight portion 8. The metal from which the frame is formed is channel shaped in cross sectional dimension and lodged in the bight portion is a strip of rubber or the like 9 which coordinates with the feature 8 in providing a convenient hand grip enabling the device to be maneuvered as though it were a go-cart. At the bottom of the frame as shown to advantage in Figure 3 is a front cross brace 10, this being adjoined at its ends to fixtures 11 of appropriate construction which constitute the mounting for the swivelling casters 12.

The companion or auxiliary unit is also aptly described as a leg frame, this being denoted generally by the numeral 13. Essentially it is characterized by a pair of spaced parallel members or legs 14, these being disposed in intersecting relation with the limbs 7 and pivotally attached centrally thereto as indicated at 15. The elements 16 and 17 coordinate in forming a top brace for the upper portion of this unit. A similar horizontal brace 18 extends across the lower end portion. On the outside just below the brace 18, are brackets 19 which facilitate attachment of what may be called the rear rollers or wheels 20.

In addition to the frame units 6 and 13 there is a third complemental frame member or unit 21. The part 21 is of general rectangular form and has wire rods 22 mounted thereon so that it functions as a rack to accommodate the market basket or other receptacle 23. The longitudinal side members of this frame are connected at points intermediate their ends by pivot pins 24 to the intermediate portions of the aforementioned limbs 7 at points above the intersecting pivots 15. The same side members are indirectly connected to the upper ends of the leg members 14 through the instrumentality of relatively short duplicate links 25. Each link is pivoted as at 26 to the upper end of the adjacent leg member 14. The opposite end of the link is pivotally adjoined as at 27 to the central or intermediate portion of the adjacent side member of the frame 21. Thus, that part 28 of this same side member between the pivot 27 and the pivot 24 cooperates as a link or lever. In other words, the parts 25 and 28 and the respective pivots 24, 26 and 27 provide a toggle connection between the two frame units 6 and 13. It follows therefore, that when the toggle links swing beyond dead center they serve to spread and hold the units 6 and 13 in carriage forming relation as evidenced from Figure 1 of the drawings. Under this arrangement it is further evident that what may be called the front end 29 of the frame 21 constitutes a hand grip, so to speak. In other words, this part 29 coordinates with the handle 28 so that it is possible to catch ahold of the two pieces simultaneously and simply "squeeze" or press the parts together, this breaking the joint, so to speak, and bringing into play the toggle effect serving to collapse the parts to the respective positions depicted in Figures 1—a and 2. This same toggle action constitutes the ever reliable means for opening up the structure from its collapsed position to the open position. During the collapsing, the parts swing in the arcs indicated by the reference letters A, B, and C. When unfolding the parts follow through the paths indicated by the lines D, E, F and G. While this is perhaps selfevident from the drawings, the directional arrows facilitate prompt comprehension.

From the description so far given it is evident that it is perhaps novel to interpose the short links 25 between the side members of the basket supporting rack or frame 21 whereby to permit the portion 28 thereof to coordinate with the links in giving the structure the desired positive toggle joint action. Then too, the adaptation under this arrangement insures rigidity when the structure is erected so that it is virtually locked in open position and not likely to accidentally collapse.

Greater rigidity and stability is insured by the use of a fourth frame unit which is in effect a secondary basket rack for what may be called the lower basket 30 (see Figure 1). The last named frame unit is denoted by the numeral 21—a and is similar to the aforementioned rack or unit 21. That is to say, it is rectangular in form and provided with basket supporting wires or equivalent elements 31. The forward end, instead of the rear end of this particular part 21—a is pivotally attached, as at 32, to the lower ends of the limbs 7. The rear end of this part 21—a is free of connection with the legs 14 and when in the down position simply rests upon the supporting end bracing rod 18. The pair of links 33 are somewhat longer than the first named links 25. These links pivotally attach at their inner ends as at 34 to the intermediate portions of the side members of the frame member or unit 21—a. Thus, again, the parts 28—a, (corresponding to the feature 28 above stated) coordinates with the limbs 7 and the pivots 32 and 34 in functioning as a stay or toggle link. The rear ends of the links 33 attach to the lower end portions of the legs 14 and in fact, extend beyond the wheels 20 whereby the extensions 35 constitute a check member. That is to say, when the device is rested against a wall or the like, these features 35 temporarily function as resting feet to engage the floor and to avoid slippage of the folded device from its stored away position.

This twin leg frame collapsible assembly, wheel supported and characterized by the upper and lower basket racks and their toggle association with the leg units, provides a safe and reliable carriage aptly fitted for the purposes intended. The simplicity is such as to obviate, it is believed, a detailed description of the operation and use. In fact, this phase of the invention appears substantially selfevident.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a basket transporting carriage of the class described, a pair of companion intersecting pivotally connected leg frames, each of said leg frames including side members, a basket rack pivotally attached adjacent its rear end between the side members of one of said leg frames, links pivotally connected to the remaining leg frame and in turn pivotally connected to the sides of said rack, a second rack having its forward end portion pivotally connected to the lower end portions of the side members of first named leg frame, the rear end of said second named rack being free of connection with the side members of the remaining leg frame, a pair of additional links, said links being connected to the lower end portions of the side members of the second named leg frame and being pivotally connected at their opposite ends to points intermediate the ends of the sides of the second named rack frame, whereby downward pressure on the rear end of said second rack will spread the leg frames and bring said first rack into horizontal operative position.

2. A carrier of the character described, said carrier comprising a pair of crossed and pivoted leg frames including wheel means on the lower ends thereof for resting on a supporting surface, each of said leg frames comprising spaced side members, an upper basket support comprising a generally horizontal frame, means pivoting said horizontal frame at points intermediate its ends to and between the side members of one of said leg frames above the pivotal point of the leg frames, link means comprising a bar pivoted at one end to the side members of the other of said leg frames, said bar being pivoted at its opposite end to the sides of said horizontal frame at points between the leg frames, the pivotal points of connection of said horizontal frame with said one leg frame, of the said bar with the said other leg frame and with said horizontal frame being arranged to occupy positions in substantially the same horizontal plane when the carrier is in open and operative position, said pivotal points and said link means being arranged to cause the rear ends of the bars to rise and elevate said upper basket support on the axis of its pivotal connection with said one leg frame when downward pressure is exerted on the rear end of said upper basket support at a point behind its pivoted connection with the said one leg frame followed by approaching movement of the upper parts of said leg frames.

3. A collapsible carrier of the character described, said carrier comprising a pair of crossed and pivoted leg frames each comprising a pair of laterally spaced sides having means at their lower ends for engagement with a supporting surface to support the carrier thereon in its expanded operative position, an upper basket support positioned between the sides of one of the leg frames and above the pivotal connection of the leg frames, said upper basket support comprising a normally horizontal frame pivoted at its sides at a point substantially spaced from the rear end thereof to and between the sides of said one leg frame, links pivoted at their rear ends to said sides of said upper basket support at points substantially intermediate the leg frames, said links being pivotally connected at their front ends to the sides of the remaining leg frame, stop means on said remaining leg frame on which the forepart of said upper basket support rests in operative position, the pivotal points of the connections of said basket support with the said one leg frame, with the rear ends of the links and of the front ends of the links with the remaining leg frame being arranged in substantially the same generally horizontal plane when said upper basket support is in operative position, to enable tilting said upper basket support rearwardly to collapse the leg frames into substantial parallelism.

4. A collapsible carrier of the character described, said carrier comprising a pair of crossed and pivoted leg frames each comprising a pair of laterally spaced sides having means at their lower ends for engagement with a supporting surface to support the carrier thereon in its expanded operative position, an upper basket carrier positioned between the sides of the leg frames above their pivotal point, said upper basket support comprising a normally horizontal frame pivoted at its sides adjacent the rear end thereof to and between the sides of one of the leg frames, links pivoted at their rear ends to said sides of said upper basket support at points substantially intermediate the leg frames, said links being pivotally connected at their front ends to the sides of the remaining leg frame, the pivotal points of the connections of said basket support with the said one leg frame, with the rear ends of the links and of the front ends of the links with the remaining leg frame being arranged in substantially the same generally horizontal plane to enable tilting said upper basket support rearwardly to collapse the leg frames into substantial parallelism, a lower basket support located between the sides of said leg frames below their pivotal point, said lower basket support comprising a normally horizontal frame pivoted at its front end to the sides of the one of said leg frames, a cross member extending between the sides of the other leg frame upon which the rear end of the lower basket support can rest in its horizontal operative position, extension feet on the lower ends of the sides of the said other leg frame, said extension feet comprising bars pivoted intermediate their ends on the said lower ends of the sides and, said extension feet normally extending forwardly and rearwardly at their pivotal mounting and in spaced relation to said supporting surface, means pivotally connecting the forwardly extending part of said feet to intermediate points on the sides of said lower basket support whereby upon elevation of the rear end of said lower basket support in collapsing the carrier operates the rearwardly extending part of said feet into engagement with said supporting surface so as to raise and support the said means at the lower ends of the corresponding leg frame off the supporting surface.

5. In a carrier of the type described, a pair of crossed and pivoted leg frames, a lower basket support pivoted at its front end to one of the leg frames below the pivotal point of the leg frames, means on the other leg frame on which the rear end of the lower basket support normally rests in a horizontal position while the leg frames are in an expanded condition, extension feet for the lower ends of the said other leg frame, said extension feet comprising bars pivoted intermediate their ends on the said lower ends of the leg frame and pivoted at their front ends to an intermediate point on the sides of said lower basket support, the part of said bars extending rearwardly from the lower ends of the leg frame being disposed at an angle to engage the ground and elevate the lower ends of the leg frames off the ground as said lower basket support has its rear end tilted upwardly in the collapsing action of the leg frames.

6. In a carrier of the type described, a pair of crossed and pivoted leg frames, each having ground engaging rollers at their lower ends, a lower basket support pivoted at its front end to one of the leg frames below the pivotal point of the leg frames, means on the other leg frame on which the rear end of the lower basket support normally rests in a horizontal position while the leg frames are in an expanded condition, extension feet for the lower ends of the said other leg frame, said extension feet comprising bars pivoted intermediate their ends on the said lower ends of the leg frame and pivoted at their front ends to an intermediate point on the sides of said lower basket support, the part of said bars extending rearwardly from the lower ends of the leg frame being disposed at an angle to engage the ground and elevate the lower ends of the leg frames and the rollers off the ground as said lower basket support has its rear end tilted upwardly in the collapsing action of the leg frames.

7. A carrier of the character described comprising a pair of crossed and pivoted leg frames each comprising spaced sides having ground engaging wheel means at their lower ends, the front wheel means being in the form of casters and the rear wheel means being in the form of fixed rollers, a lower basket supporting frame having its front part pivoted on a horizontal axis to and between the lower part of the side members of the caster equipped leg frame, said lower basket supporting frame having its rear part disposed freely between the side members of the roller equipped leg frame, a cross bar secured between the lower part of the side members of the last mentioned leg frame to support the rear part of said lower basket supporting frame in its horizontal operative position with the leg frames spread, rearwardly declining bars pivoted at their upper and forward ends to the sides of said lower basket supporting frame intermediate the front and rear thereof, said bars having their rear and lower ends positioned to extend rearwardly of the rollers of the roller equipped leg frame in the spread position of the leg frames and out of contact with the ground, means pivoting said bars to the lower part of the last mentioned leg frame in the vicinity of the axis of the rollers thereof, whereby upon elevation at the rear part of the lower basket supporting frame the rear ends of said bars engage the ground at a distance below said rollers with the leg frames in a collapsed condition to support the carrier with the casters and rollers free of the ground.

8. A carrier of the character described comprising a pair of crossed and pivoted leg frames each comprising spaced sides having ground engaging wheel means at their lower ends, the front wheel means being in the form of casters and the rear wheel means being in the form of fixed rollers, a lower basket supporting frame having its front part pivoted on a horizontal axis to and between the lower part of the side members of the caster equipped leg frame, said lower basket supporting frame having its rear part disposed freely between the side members of the roller equipped leg frame, a cross bar secured between the lower part of the side members of the last mentioned leg frame to support the rear part of said lower basket supporting frame in its horizontal operative position with the leg frames spread, rearwardly declining bars pivoted at their upper and forward ends to the sides of said lower basket supporting frame intermediate the front and rear thereof, said bars having their rear and lower ends positioned to extend rearwardly of the rollers of the roller equipped leg frame in the spread position of the leg frames and out of contact with the ground, means pivoting said bars to the lower part of the last mentioned leg frame in the vicinity of the axis of the rollers thereof, whereby upon elevation of the rear part of the lower basket supporting frame the rear ends of said bars engage the ground at a distance below said rollers with the leg frames in a collapsed condition to support the carrier with the casters and rollers free of the ground, toggle means connected between the upper parts of the leg frames above their pivotal connection for locking the leg frames in expanded condition.

9. A carrier of the character described comprising a pair of crossed and pivoted leg frames each comprising spaced sides having ground engaging wheel means at their lower ends, the front wheel means being in the form of casters and the rear wheel means being in the form of fixed rollers, a lower basket supporting frame having its front part pivoted on a horizontal axis to and between the lower part of the side members of the caster equipped leg frame, said lower basket supporting frame having its rear part disposed freely between the side members of the roller equipped leg frame, a cross bar secured between the lower part of the side members of the last mentioned leg frame to support the rear part of said lower basket supporting frame in its horizontal operative position with the leg frames spread, rearwardly declining bars pivoted at their upper and forward ends to the sides of said lower basket supporting frame intermediate the front and rear thereof, said bars having their rear and lower ends positioned to extend rearwardly of the rollers of the roller equipped leg frame in the spread position of the leg frames and out of contact with the ground, means pivoting said bars to the lower part of the last mentioned leg frame in the vicinity of the axis of the rollers thereof, whereby upon elevation of the rear part of the lower basket supporting frame the rear ends of said bars engage the ground at a distance below said rollers with the leg frames in a collapsed condition to support the carrier with the casters and rollers free of the ground, toggle means connected between the upper parts of the leg frames above their pivotal connection for locking the leg frames in expanded condition, said toggle means comprising an upper basket supporting frame.

SYLVAN N. GOLDMAN.